(12) United States Patent
Lou-Hsiao

(10) Patent No.: US 7,604,236 B2
(45) Date of Patent: Oct. 20, 2009

(54) LANGUAGE LEARNING BOARD GAME

(76) Inventor: Sholeen Lou-Hsiao, 712 George St., Teaneck, NJ (US) 07666

( * ) Notice: Subject to any disclaimer, the term of this patent is extended or adjusted under 35 U.S.C. 154(b) by 239 days.

(21) Appl. No.: 11/614,611

(22) Filed: Dec. 21, 2006

(65) Prior Publication Data

US 2008/0108028 A1    May 8, 2008

Related U.S. Application Data

(60) Provisional application No. 60/864,512, filed on Nov. 6, 2006.

(51) Int. Cl.
*A63F 3/06* (2006.01)

(52) U.S. Cl. .................. 273/269; 273/273; 273/296; 273/302; 434/157

(58) Field of Classification Search .................. 273/269, 273/273, 272, 296, 157 R, 302; 434/157, 434/167, 171, 333
See application file for complete search history.

(56) References Cited

U.S. PATENT DOCUMENTS

| | | | | |
|---|---|---|---|---|
| 760,884 | A | * 5/1904 | Looff et al. | .................... 84/117 |
| 1,359,115 | A | * 11/1920 | Sittinger | ...................... 434/333 |
| 3,464,124 | A | * 9/1969 | Lynd | .......................... 434/170 |
| 3,707,287 | A | * 12/1972 | Spector | .................. 273/157 R |

(Continued)

FOREIGN PATENT DOCUMENTS

CN        87205660 U      1/1988

(Continued)

OTHER PUBLICATIONS

Multilingual Word Match Game; http://ccat.sas.upenn.edu/german/yiddish/project/WordMatch/ web print out, Dec. 20, 2006.

(Continued)

*Primary Examiner*—William M Pierce
(74) *Attorney, Agent, or Firm*—Marguerite Del Valle

(57) ABSTRACT

An educational board game that may be played in several ways by either a single player or two or more players in competition with each other is disclosed. Each player plays the game with a game board in conjunction with one or more sets of game cards. The game boards have on one or both surfaces vocabulary elements that may be one or more words or phrases in a first language or that may be an image representing one or more words or phrases. The game boards also may have on one of its surfaces a reference number. A set of game cards may be one-sided, in which case each card may have on a surface one or more words or phrases in a first language. A set of game cards also may be double-sided, in which case the cards may have on a first surface one or more words or phrases in a first language and on a second surface a translation of the words or phrases on the first surface. The double-sided game card also may have on a surface a pronunciation key, a reference number, or both. The game may be played in various implementations depending on the player's age and level of proficiency in that language that is to be learned. An electronic version of the educational board game is also disclosed which includes a device for pronouncing words in a language to be learned.

9 Claims, 11 Drawing Sheets

U.S. PATENT DOCUMENTS

| | | | | |
|---|---|---|---|---|
| 3,892,409 | A | * | 7/1975 | Herbert, Jr. .................. 273/271 |
| 4,021,937 | A | * | 5/1977 | Kravitz ....................... 434/167 |
| 4,498,869 | A | * | 2/1985 | Faison ........................ 434/184 |
| 4,535,995 | A | * | 8/1985 | Warnick ...................... 273/273 |
| 4,644,492 | A | * | 2/1987 | Murata .......................... 704/3 |
| 4,890,844 | A | | 1/1990 | Weiss |
| 5,094,465 | A | * | 3/1992 | Dawson ....................... 273/429 |
| 5,139,270 | A | * | 8/1992 | Gernhofer ................... 273/269 |
| 5,377,990 | A | * | 1/1995 | Seeney-Sullivan .......... 273/236 |
| 5,458,338 | A | * | 10/1995 | Beardsley ................... 273/269 |
| 5,743,740 | A | * | 4/1998 | Visser et al. ................. 434/128 |
| 6,419,231 | B1 | * | 7/2002 | Rivera ........................ 273/271 |
| 6,608,618 | B2 | * | 8/2003 | Wood et al. ................. 345/173 |
| 6,702,581 | B1 | * | 3/2004 | Walker ....................... 434/167 |
| 6,746,017 | B2 | * | 6/2004 | Yu et al. ..................... 273/273 |
| 7,001,183 | B2 | * | 2/2006 | Dowrick ..................... 434/178 |

FOREIGN PATENT DOCUMENTS

| | | |
|---|---|---|
| CN | 2612004 Y | 4/2004 |
| CN | 1959761 A | 5/2007 |

OTHER PUBLICATIONS

Tracy Boyd, Quia—Phonological Awareness: Rhyme Time Picture Match-Up, http://www.quia.com/mc/334099.html web print out, Dec. 20, 2006.

Japanese Language Game—Kanji Matching Pairs; http://japanese.about.com/library/bltoy7k.htm web print out, Dec. 20, 2006.

* cited by examiner

LANGUAGE LEARNING BOARD GAME

CROSS REFERENCE TO RELATED APPLICATION(S)

This application claims the benefit of priority of U.S. Provisional Patent Application Ser. No. 60/864,512, filed on Nov. 6, 2006.

TECHNICAL FIELD

This disclosure relates to an educational board game, and more particularly to an educational board game that is intended to assist players of all ages in learning and memorizing words or phrases of a language.

BACKGROUND

For many people, learning a new language can be a formidable undertaking. It can be especially difficult to learn a character-based language, such as a language that uses unique characters or symbols for distinct words rather than a combination of letters drawn from a limited alphabet.

A variety of methods are used to help people learn a new language. One potentially effective method is to incorporate the learning process into a game so that amusement or competition supplants the uneasiness people frequently feel toward learning something new. As the players are being entertained by their participation in the game, repeated exposure to visual or verbal language elements of the game act to familiarize the players with the desired aspects of the language.

A principal challenge to educational games directed at learning a language, however, is the vast vocabulary typical of virtually all languages commonly used today. It is desirable for the game's participants to not only be able to associate new vocabulary words with the things they represent, but to also learn the proper pronunciation of those words.

Accordingly, there exists a need for a game that stimulates players of various ages and proficiency levels to learn a language interactively in a manner that is both fin and challenging, and that is adaptable to accommodate new words or phrases to be learned as a player becomes more proficient.

SUMMARY

An educational board game and methods of playing the game are disclosed.

According to one aspect, the board game includes a game board and a group of cards. The game board has a first surface with a plurality of locations each of which has an image representative of a word or phrase in a first language. The game board also has a second surface with a plurality of locations each of which has a word or phrase in the first language. Each card in the group of cards has on a first surface a word in the first language corresponding to one of the images or words or phrases on a surface of the game board. The words or phrases on the second surface of the game board may be represented by a corresponding one of the images or words or phrases on a surface of the game board.

Each card also may have on a second surface a translation of the word on the first surface of the card into a second language, a key for pronouncing the word on the first surface of the card, a number for matching to a number on the game board, or a combination thereof. The board game also may include a second group of cards. Each card in the second group may have on a surface a word in the first language corresponding to one of the images or words or phrases on a surface of the game board.

The images on the first surface of the game board and the words or phrases on the second surface of the game board may be arranged in respective matrixes. The respective matrixes may be arranged so that each of the words or phrases on the second surface of the game board is in a location corresponding to the location of a corresponding one of the images that represents the word or phrase on the first surface of the game board.

In addition, the words or phrases may appear in a language having words based on characters or symbols.

In one implementation, an electronic version of the board game also may include a pronunciation device having a speaker. The cards are adapted to couple to the game board, and the game board is adapted to couple to the pronunciation device. When a card is placed on a corresponding image or word or phrase on the game board, an audible signal representing the pronunciation of the image or word or phrase is generated through the speaker of the pronunciation device. The pronunciation device also may have a selector to allow selection of one of several languages.

Each card in the group may have a contact for electro-magnetically coupling to a corresponding contact on the game board. In addition, the game board may have a contact for electro-magnetically coupling to a contact on the pronunciation device.

In one implementation, a cartridge may be included that is adapted to electrically couple to the pronunciation device. The cartridge is preloaded with data representing the pronunciation of images or words or phrases on the game board. The cartridge may have a selector to allow selection of one of several languages.

In another implementation, a method of playing the game includes selecting a card from a group of cards. Each card in the group has on a first surface a word in a first language corresponding to an image or word or phrase on a surface of a game board. The game board has first and second surfaces. The first surface of the game board has a plurality of locations each of which has an image representative of a word or phrase in the first language and the second surface has a plurality of locations each of which has a word or phrase in the first language. After selecting the card, the player places the selected card on a corresponding image or word or phrase on the game board. The player continues to select and place cards on the game board until a predetermined number of matches have been obtained. In addition, a key for pronouncing the word in the first language on the first surface of the game card may be read.

The correctness of the placement of a selected card may be verified by referring to a second group of cards that has on each card a translation of the word on the first surface into a second language.

Multiple players may play the board game. Each player has a game board and the players compete to be the first to place cards from the group of cards on a predetermined number of corresponding images or words or phrases on their respective game boards. A player who discovers an erroneously matched card in another player's board may be declared the winner. In addition, the winner may be the player who is first to state a predetermined word or phrase after matching cards from the group of cards to a predetermined number of images or words or phrases on the player's game board.

Selecting a card from a group of cards may include spreading the cards out so that the first surfaces of all cards in the group are facing the same direction. A player may turn a card over, and may keep the card if the card corresponds to an image or word or phrase on the game board or return the card to its original position if the card does not correspond to an image or word or phrase on the game board.

In addition, the cards may be selected out of a bag. A player may keep the card if the card corresponds to an image or word or phrase on the game board or return the card to the bag if the card does not correspond to an image or word or phrase on the game board.

The details of one or more implementations are set forth in the accompanying drawings and the description below. Other features and advantages will be apparent from the description and drawings, and from the claims.

DETAILED DESCRIPTION

Figure 1:
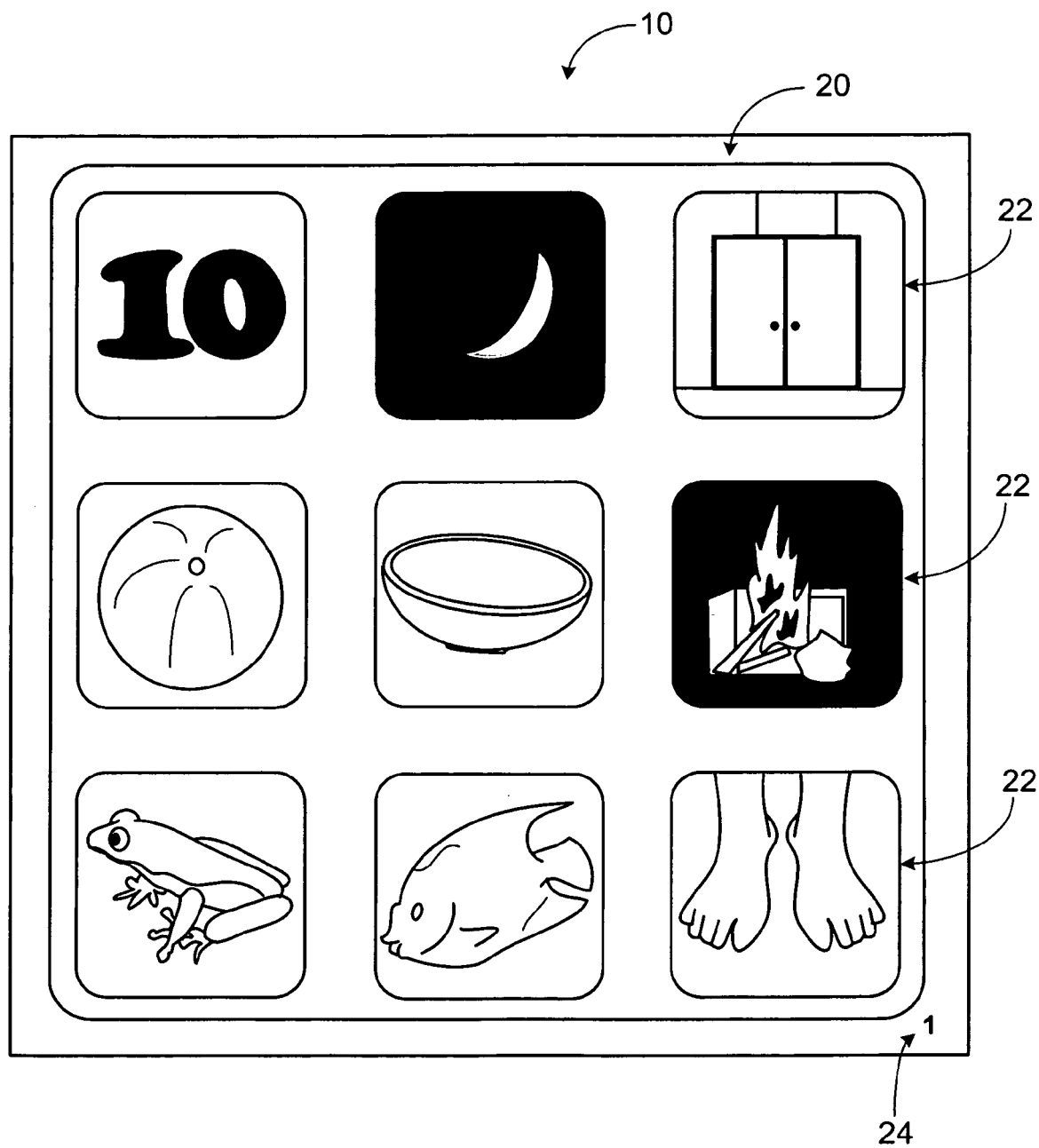
FIG. 1 is a plan view of a playing surface of a representative game board according to an implementation of the present invention.

In a particular implementation, the educational board game may include multiple game boards, each of which includes at least one vocabulary element, and one or more sets of game cards. As shown in FIG. 1, a game board 10 has an image side 20 with pre-selected unique images 22 as the vocabulary elements. The images 22 may be arranged in a matrix. FIG. 1 shows a three-by-three square matrix, but in alternative implementations the images 22 may be arranged in other ways. Each image 22 may be a photographic or illustrated depiction of one or more words. The image side 20 also may include a game board reference number 24 to facilitate gathering a set of game cards.

Figure 2:
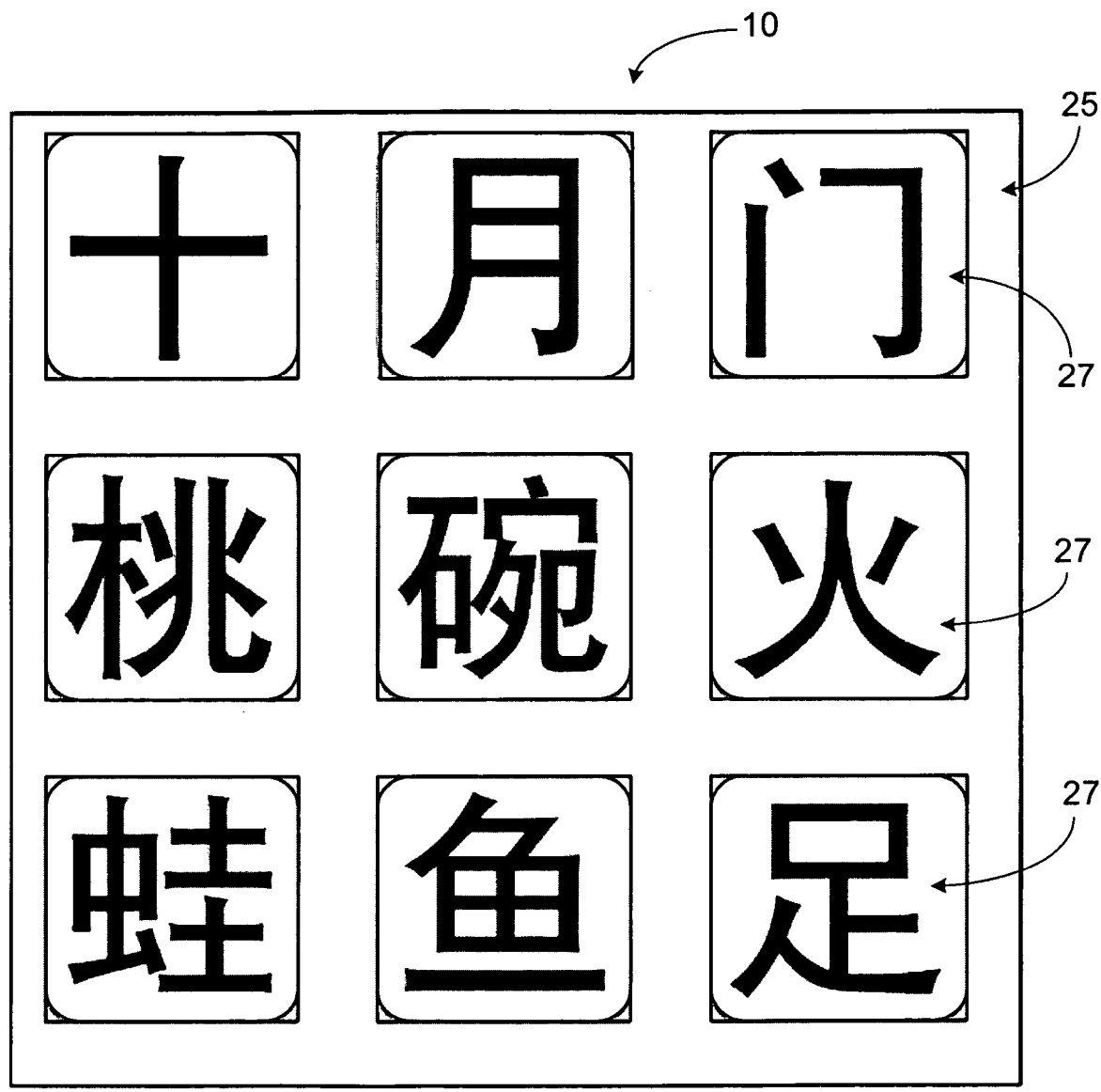
FIG. 2 is a plan view of the opposite surface of the representative game board of FIG. 1 according to an implementation of the present invention.

A game board 10 may be playable on both sides. On the side opposite to the image side 20, for example, there may be a language side 25 (see FIG. 2), which preferably includes primary language words 27 as vocabulary elements arranged in a matrix of the same dimensions as the matrix on the image side 20. Depending on the language to be learned, the primary language words 27 may consist of one or more characters, symbols, letters of an alphabet, or elements of any other type of writing convention used in the language. Each word 27 is photographically or illustratively represented by the corresponding image 22 on the board's image side 20 and is located at a position in the matrix that corresponds to the image's location in its respective matrix. Thus, for example, the lower right-hand image 22 on the image side 20 of the sample game board in FIG. 1 illustrates "feet." The corresponding lower right-hand primary language word 27 on the language side 25 of the board in FIG. 2 represents the word for "feet" in Chinese.

Figure 3:
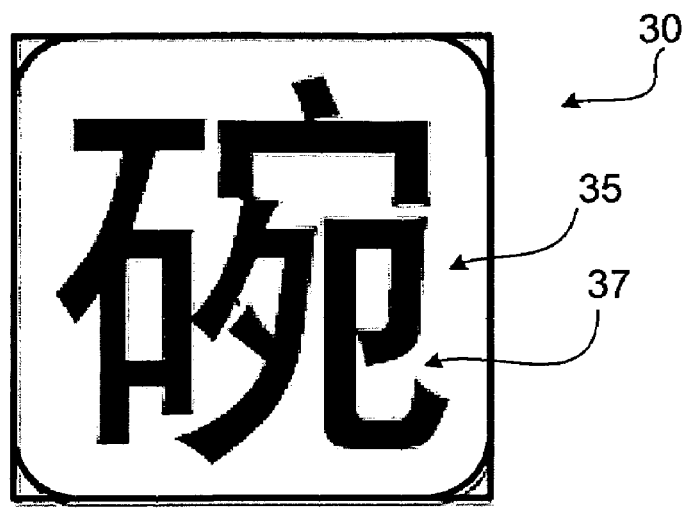
FIG. 3 is a plan view of a surface of a representative single-sided game card according to an implementation of the present invention.

FIG. 3 shows a representative single-sided game card 30 that may be used in conjunction with the game boards 10. The single-sided game card 30 is part of a set of such cards and contains on a primary language side 35 at least one primary language word 37 that is substantially identical to a primary language word 27 contained on the language side 25 of one of the game boards 10. The opposite side of the card may be blank. Alternatively, it may contain a graphic, word, or some combination thereof that is identical in all game cards belonging to the set, such as an image bearing the name of the game. The set of cards to which the game card 30 belongs includes at least one card for every vocabulary element (i.e., primary language word 27 or image 22) appearing on the game boards 10 that are being played with.

Figure 4:
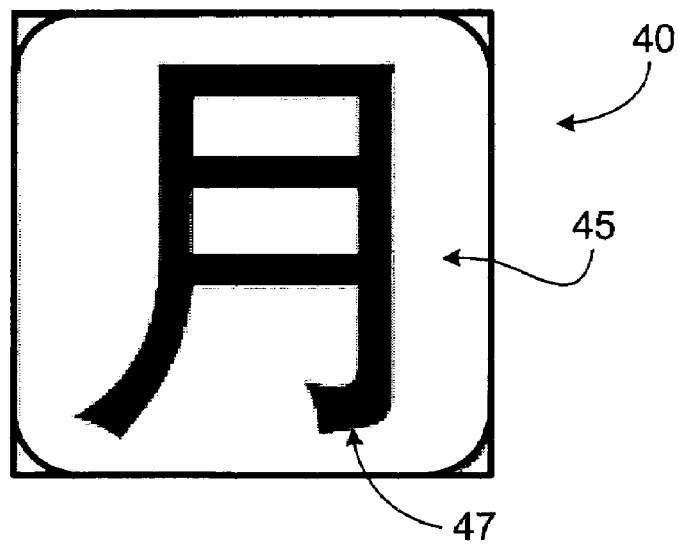
FIG. 4 is a plan view of a surface of a representative double-sided game card according to an implementation of the present invention.
Figure 5:
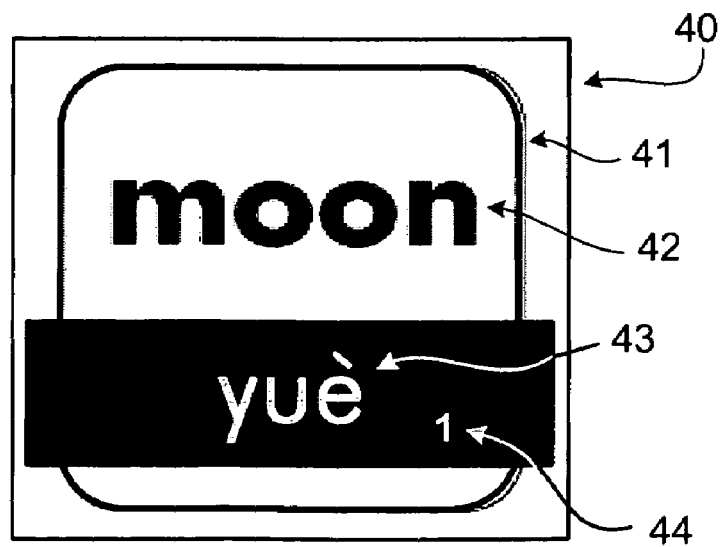
FIG. 5 is a plan view of the opposite surface of the representative double-sided game card of FIG. 4 according to an implementation of the present invention.

In addition to the single-sided game cards 30, the educational board game also may include a set of double-sided game cards 40 (see FIGS. 4-5). A double-sided game card 40 may contain, for example, a primary language word 47 on a primary language side 45 and a secondary language word 42 on a secondary language side 41. The primary language word 47 is substantially identical to a primary language word 27 contained on the language side 25 of a game board 10. The secondary language word 42 is a translation of the primary language word 47 to a second language (e.g., a language that is more familiar to the player than is the language that is to be learned by playing the game). Thus, for example, the sample game card 40 shown in FIG. 4 has on its primary language side 45 a primary language word 47 that is the Chinese word for "moon." As shown in FIG. 5, on the secondary language side 41 of the card there is a secondary language word 42 that is the English word "moon."

The double-sided game card 40 also may contain on its secondary language side 41 a pronunciation key 43 that transliterates the primary language word 47 to a language with which the player has some familiarity. For example, the pronunciation key 43 may be a phonetic spelling of the primary language word 47, or alternatively drawn from an established transliteration system such as pinyin. In the example of FIG. 5, the pronunciation key "yuè" is a transliteration of the Chinese character for "moon" on the primary language side 45 of the card 40 into the English language.

In an alternative implementation, more than one secondary language word 42 may appear on the secondary language side 41 so that a single educational board game may be played by variety of players familiar with a variety of languages.

Like the single-sided game cards 30, the double-sided game card 40 is part of a set of similar cards comprised of at least one card for every vocabulary element (i.e., primary language word 27 or image 22) appearing on the game boards 10 that are being played with.

The cards 30, 40 may include a reference number associating a particular game card with a particular game board 10. As shown in FIG. 5, in the preferred embodiment the secondary language side 41 of the double-sided game card 40 has a game card reference number 44 indicating that the card 40 should be paired with a game board 10 bearing the same game board reference number 24.

Although the foregoing description discloses primary language words 27, 37, 47 and secondary language words 42 that each consist of a single word, in alternative implementations multiple words may be combined to form a phrase or expression. For example, the vocabulary element in the lower right-hand corner in FIG. 2 may consist of the words for "one pair of feet" in the language to be learned rather than the single word "feet." Then the lower right-hand image 22 on the opposite side of the game board 10 (see FIG. 1) should show an image corresponding to the phrase "one pair of feet." In addition, the cards 30, 40 that correspond to vocabulary elements consisting of multiple words should have on their respective surfaces the phrase or expression expressed by the words written in a primary or secondary language.

Using game boards 10 and at least one of a set of game cards 30, 40, a single player, or two or more players in competition with each other, may play the educational board game described in further detail below. Because the players may be of various ages and proficiency levels in the language to be learned, the game rules may be varied to accommodate them. The game may be played, for instance, at an elementary, intermediate, or advanced level. Additional game boards and cards may be added, for example through expansion packs to the game, as a player advances through the levels and desires to learn additional vocabulary words.

In one implementation at the elementary level, only the language sides 25 of the game boards 10 and one of the set of game cards 30, 40 are required. Preferably, the double-sided game cards 40 containing the game card reference numbers 44 are used, in which case a young player or one at a beginner's level plays the game by first choosing a game board 10 and using the reference numbers 24, 44 to collect all the game cards 40 corresponding to the board chosen. Once all the necessary game cards 40 are collected, the player attempts to place each card 40, with the primary language side 45 facing up, over the matching primary language word 27 of the game board 10. To encourage the player to continue until all cards 40 are properly matched, another participant may shout words of encouragement each time a correct match is made.

In addition, the pronunciation of a primary language word 47 may be incorporated at the elementary level into the learning process by having another participant pronounce the word 47 according to the pronunciation key 43 prior to or after the player's attempt at matching the card 40. As an additional tool for learning the pronunciation of the words 47 at any level of game play, a compact disc or other electronic media containing the proper pronunciation may be included with the game.

At the next, or intermediate, level the game may be played in several ways by two or more players competing to match game cards 30, 40 to the primary language side 25 of a respective game board 10 chosen by each player. In a first variation of game play, for example, the game setup involves having the players place their chosen game boards 10 with the primary language side 25 face up. The cards of one of the set of game cards 30, 40 are laid out randomly with the primary language words 37, 47 visible and with the cards accessible to all players. After the boards and cards are set, the players wait until a predetermined reference time, whereupon they begin a race to locate the game cards 30, 40 corresponding to their respective game board 10 and to place the appropriate cards over the matching primary language words 27 on their board. The player who is first to situate a matching card 30, 40 over all the primary language words 27 on their board may be determined the winner.

In a second variation of the game at the intermediate level, the game may be set up by having each player choose a game board 10 and randomly laying out all the double-sided game cards 40 so that their secondary language sides 41 are visible and accessible to all players. Each player's game board 10 should have its primary language side 25 facing up. At a predetermined reference time, the players attempt to locate the cards 40 that correspond to the primary language words 27 on their respective boards 10. The players may accomplish this, for example, by searching the cards 40 for the secondary language words 42 that translate their respective boards' primary language words 27. The players also may rely on the cards' pronunciation keys 43, which transliterate the primary language words 27. In addition, the players may locate the cards by turning over the game cards 40 one at a time to reveal the primary language word 47 on the primary language side 45. If a card is turned over but is not the one sought, the player who turned over the card returns the card to its original position so that other players may access the card. The winner is the first player to match all of the primary language words 27 on his or her board 10 correctly with their corresponding cards 40.

A third variation at the intermediate level may include providing a bag or other container from which the players randomly select game cards 30, 40. Preferably, the bag should contain only one of the sets of game cards 30 or 40 and should be of an opaque color to ensure random selection. Also preferably, the double-sided game cards 40 should be used. The players may determine a selection order, for example, according to the age of each player. Each player also should select a game board 10 and place it with the primary language side 25 facing up. After the first player selects a card 30, 40 from the bag, the player either should keep the card if its primary language word 37, 47 matches a primary language word 27 on the player's board 10 or return the card to the bag if no such match is made. The player may be given a limited amount of time to decide whether he or she should keep the card or return it to the bag. If such a time limit is imposed on the player, the other players may remind him or her of how much time is left, for example, by counting up or down to indicate the remaining time. The game play may proceed cyclically through the selection order until a player selects and matches, for example, all of a predetermined subset of cards 30, 40 corresponding to the player's board 10, such as the cards corresponding to a particular row, column, or diagonal of the board's matrix of primary language characters 27. A winner may be declared when all of the subset of cards are properly matched. Alternatively, the player may be required to find matches for all the primary language words 27 on their respective boards 10 before that player is declared the winner.

At the advanced level, the following variations of the game may be played, for example, with the image side 20 of the game board 10 facing up and with one of the sets of game cards 30, 40. Preferably, the single-sided game cards 30 are used. The initial setup of a first variation may require that the cards 30 be set randomly before the players with the primary language words 37 displayed. At a predetermined reference time, the players compete to collect the cards 30 that bear the primary language words 37 of the images 22 depicted on their respective boards 10. The first player to cover all of his or her board's images 22 with the cards 30 bearing their corresponding primary language words 37 may be the winner.

In a second, more advanced, variation of the game at the advanced level, the single-sided game cards 30 may be set before the players with their primary language sides 35 facing down such that the players are initially unable to differentiate between the cards 30. According to a predetermined order of selection, for example by age, each player is to randomly turn over a single card 30 and display its primary language side 35 to all players. If the turned over card 30 contains a primary language word 37 that corresponds to an image 22 displayed on the player's board 10, the player should keep the card 30 and place it on the board over its corresponding image 22. If the card 30 does not correspond to any image 22 on the player's board 10, the player should return the card to its original position with the primary language side 35 face down. The game's winner is the first player to match, for example, all of a predetermined subset of cards 30 corresponding to the player's board 10, such as the cards corresponding to a particular row, column, or diagonal of the board's matrix of images 22. In some implementations, a player may be required to match all the images 22 on his or her board 10 to be declared the winner.

The game may be played in a third variation at the advanced level, wherein the players are to randomly select single-sided game cards 30 out of an opaque bag or other container according to a predetermined selection order. A player making a selection either should keep the card if its primary language word 37 matches an image 22 on the player's board 10 or otherwise return the card to the bag. The player may be given a limited amount of time to decide whether he or she should keep the card or return it to the bag. The other players also may remind him or her of how much time is left, for example, by counting up or down to indicate the remaining time. The game's winner is, for example, the player who selects and matches all of a predetermined subset of cards 30 corresponding to the images 22 on the player's board 10. In some implementations, a player may be required to match all the images 22 on his or her board 10 to be declared the winner.

In each of the foregoing variations of the game, an additional step of verifying a winner may be included. For example, the double-sided game cards 40 may be checked to confirm the correctness of matches made by the game's participants. If a player is found to have made an incorrect match, the player may be disqualified and a new winner, for instance the player who discovered the incorrect match, may be declared.

The educational board game of the present invention also may be implemented in various electronic formats based on hardware, software, or a combination thereof. Electronic versions of the game may be played in substantially the same ways as described above, and may additionally include a device for pronouncing vocabulary elements in a language that a player is desired to learn.

Figure 6:
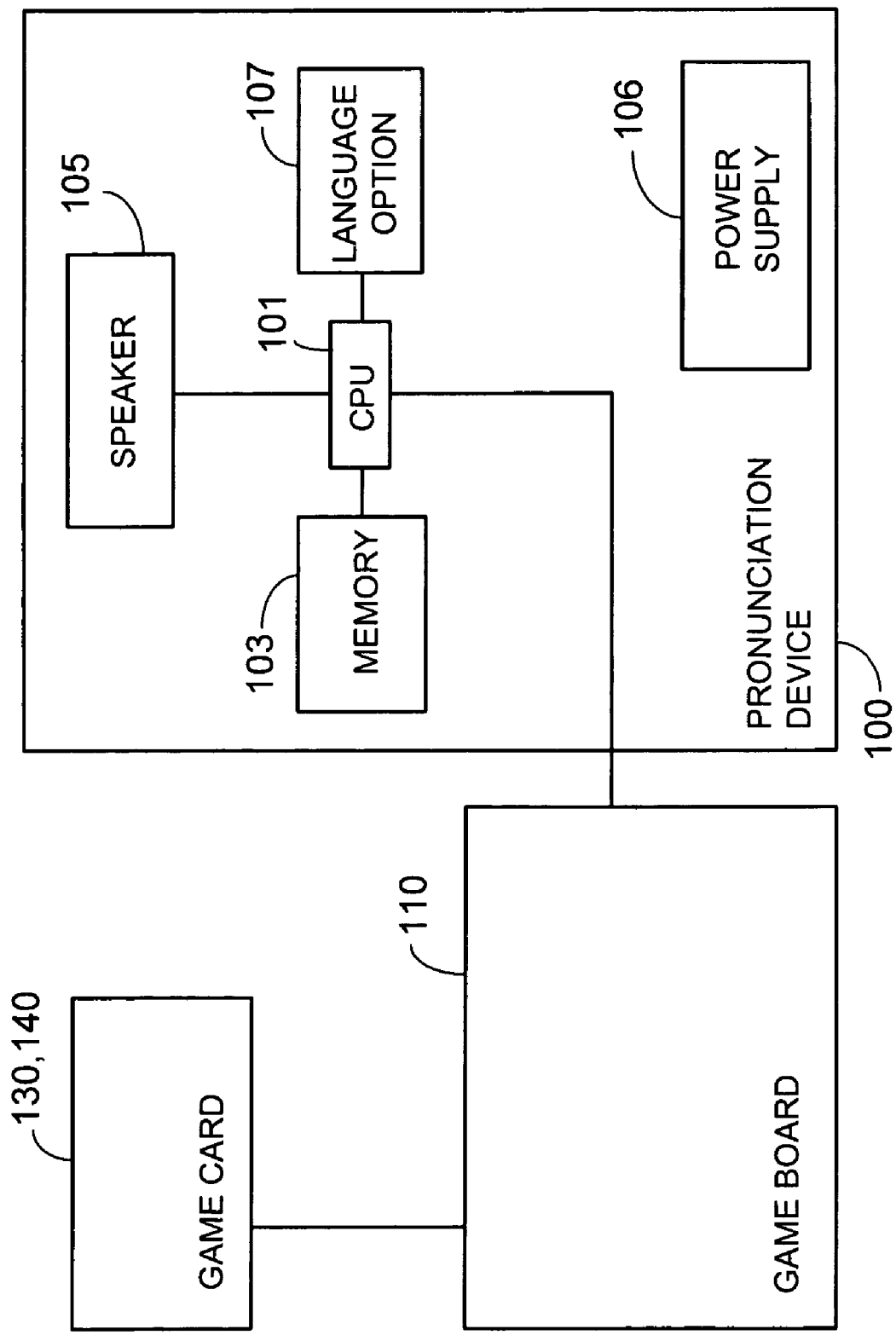
FIG. 6 is a block diagram of an implementation of an electronic version of the game.

FIG. 6 shows a block diagram of one implementation of the game in an electronic format that includes a pronunciation device 100, a game board 110 and a game card 130, 140. The game board 110 may be one of a several game boards included in the game, and the game card 130, 140 is one card in a set of single-sided or double-sided game cards. The pronunciation device 100 has a central processing unit (CPU) 101, memory 103, a speaker 105, a power supply 106, and a language option 107. The memory 103 stores information representing the pronunciation of vocabulary elements and may be any electronic storage device, such as a masked Read Only Memory (ROM), Flash memory, Random Access Memory (RAM), or any other similar device. The language option 107 may be included in the pronunciation device 100 if the vocabulary element may be pronounced in more than one language.

When a card 130, 140 is properly positioned over a corresponding vocabulary element on the board 110, the board recognizes a correct match and indicates the match to the pronunciation device 100. The board may recognize a correct match in various ways. For example, a card may be designed to mechanically or magnetically couple only to the location of a particular vocabulary element on a game board 110. This may be accomplished, for example, by having a mechanical or magnetic trigger on each card that is uniquely positioned and that matches an analogously positioned reciprocal mechanical or magnetic trigger on the vocabulary element that corresponds to the card.

The game board 110 also may indicate the match to the pronunciation device 100 in a variety of ways. In one implementation, each board 110 may mechanically couple to the device 100 in such a way as to identify to the device which board is being played with, for example through a punch-card system. In addition, the board 110 may indicate which vocabulary element has been matched with a corresponding card, for example, by setting off a mechanical trigger on the board 110 that indicates the location of the vocabulary element and that couples to the device 100. Thus, with the combined information of which board is connected to the device 100 and which location on the board has been matched, the CPU 101 of the pronunciation device may be able to determine which vocabulary element to pronounce.

As described in further detail below, in alternative implementations, the cards 130, 140 may electromagnetically couple to the game board 110. Similarly, the game board 110 may electromagnetically couple to the pronunciation device 100.

After the pronunciation device 100 is notified of the correct match, the CPU 101 uses that information to generate an audible signal through the speaker 105 that corresponds to the pronunciation of the vocabulary element in a language indicated by language option 107. For example, the CPU 101 may retrieve from memory 103 the information representing the pronunciation of the correctly matched vocabulary element. The CPU 101 then sends a signal corresponding to that information to the speaker 105. If the vocabulary element may be pronounced in more than one language, the CPU 101 also may selectively retrieve from memory 103 the pronunciation of the vocabulary element in only the language indicated by the language selector 107.

Figure 7:
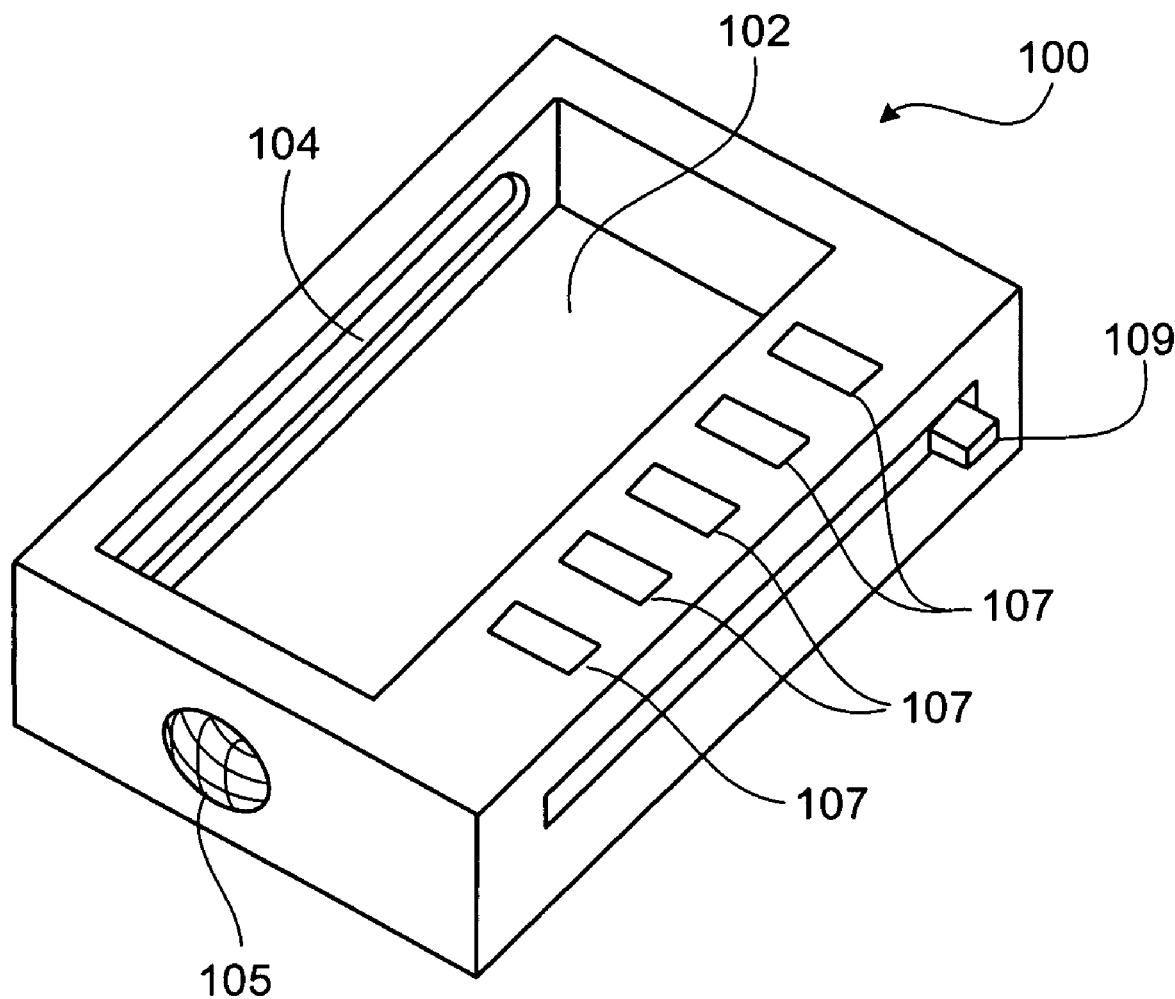
FIG. 7 is a perspective view of an electronic pronunciation device according to an implementation of the present invention.

FIG. 7 shows one implementation of a pronunciation device 100 having an electronic game board receiving area 102. An electronic game board may be placed within the receiving area 102, for example, by inserting the board though a slot 104. When the board is in the receiving area 102, the board should be electromagnetically coupled to the device 100. The device 100 also may include a speaker 105, multiple language options 107 and a language selector 109. The language selector 109 may be moved manually to select a desired language option 107. As described in further detail below, when a player matches an electronic game card to a vocabulary element on a corresponding electronic game board, the device 100 generates an audible sound through the speaker 105 that corresponds to the pronunciation of the word represented by the vocabulary element in the language indicated by the language selector 109.

Figure 8:
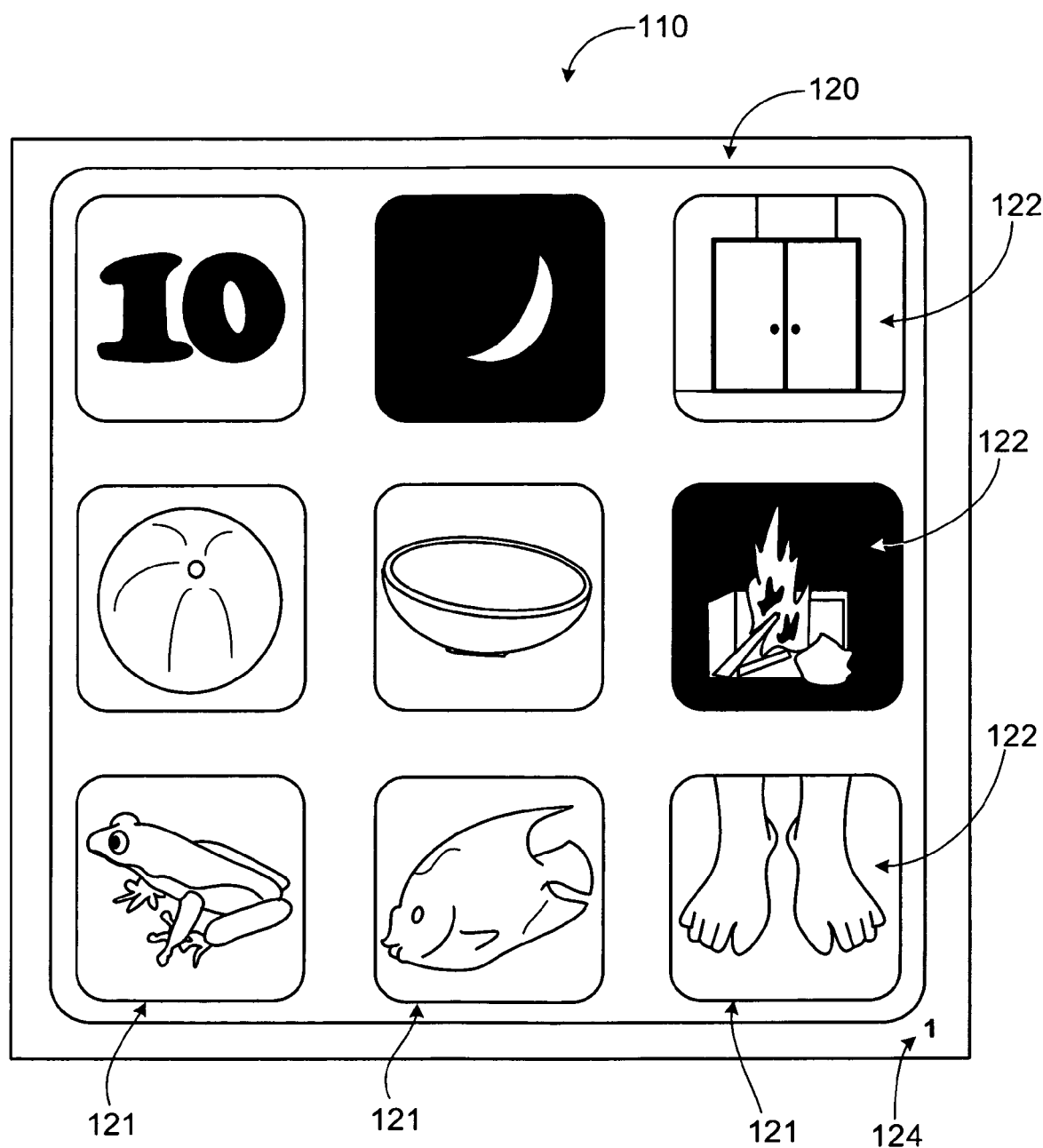
FIG. 8 is a plan view of a representative electronic game board according to an implementation of the present invention.

Like the game board 10, an electronic game board 110 that electrically couples to the pronunciation device 100 may have an image side 120 including, for example, a matrix of preselected unique images 122 as vocabulary elements (see FIG. 8). The board 110 also may have a game board reference number 124. In one implementation, in the vicinity of each image 122 is an electrical contact 121 located such that it will be electrically coupled to an electrical contact on an electronic game card when the card is positioned above the image 122. FIG. 8 shows electrical contacts 121 formed along the boarders of the images 122. Some implementations include contacts that use other types of electro-magnetic coupling.

Figure 9:
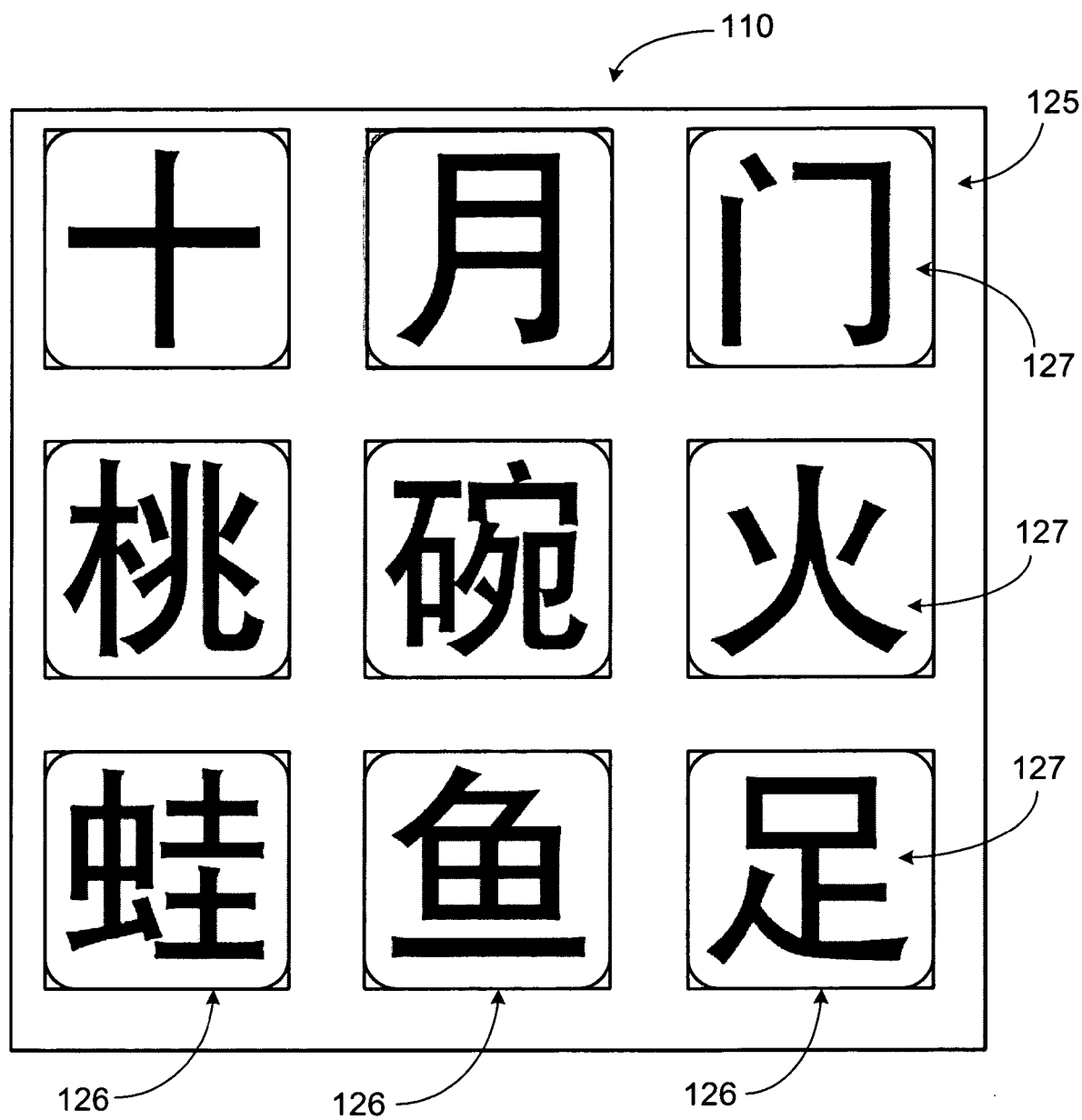
FIG. 9 is a plan view of the opposite surface of the representative electronic game board of FIG. 8 according to an implementation of the present invention.

Also, like the game board 10, the second side of the electronic game board 110 may have a language side 125 comprising a matrix of primary language words 127 as vocabulary elements (see FIG. 9). The language side 125 has an electrical contact 126 in the vicinity of each primary language word 127, for example along the boarder surrounding each word. The electrical contact 126 associated with a word 127 may be electrically coupled to an electrical contact on an electronic game card corresponding to the word. In an alternative implementation, the image side 120 and the language side 125 may stand alone such that each side is on a separate electronic game board 110. Some implementations use other types of electromagnetic coupling.

Figure 10:
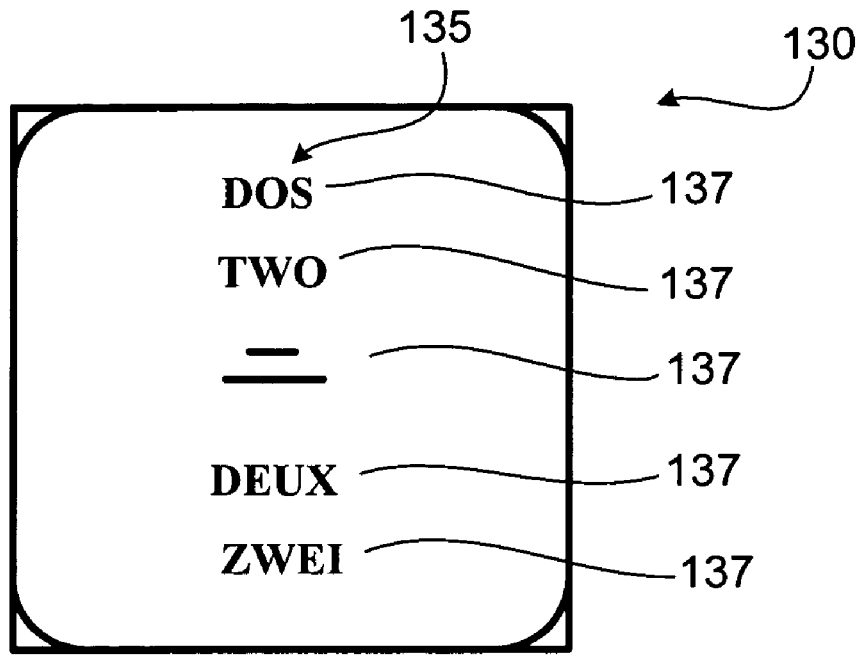
FIG. 10 is a plan view of a surface of a representative single-sided electronic game card according to an implementation of the present invention.
Figure 11:
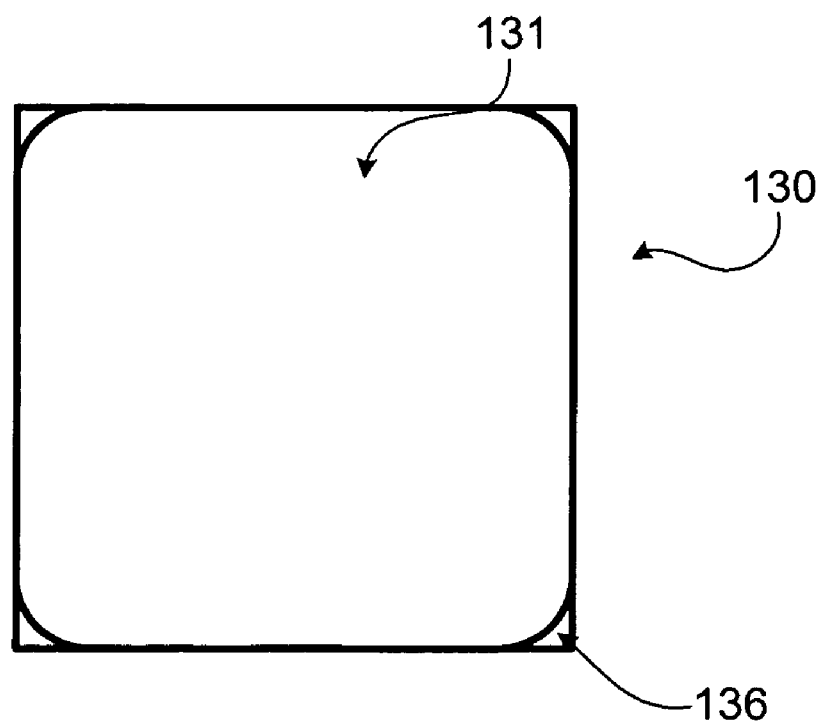
FIG. 11 is a plan view of the opposite surface of the representative single-sided electronic game card of FIG. 10 according to an implementation of the present invention.

FIGS. 10-11 show opposite surfaces of a representative single-sided electronic game card 130 according to a particular implementation. The card 130 is part of a set of single-sided cards and may have one or more primary language words 137 on a primary language side 135. If multiple words 137 appear on the card 130, each word should be a translation of the others into a different language different. The languages in which the words 137 appear also should be language options 107 available on the electronic game board 110 and which can be selected by a player using the language selector 109.

On the surface opposite the primary language side 135, there may be a backside 131 having an electromagnetic contact 136, for example, along the boarder of the card (see FIG. 11). Because the card 130 is a single-sided card, the backside 131 may be blank, or may contain a graphic, word, or some combination thereof that is identical in all single-sided game cards 130 in the set.

Figure 12:
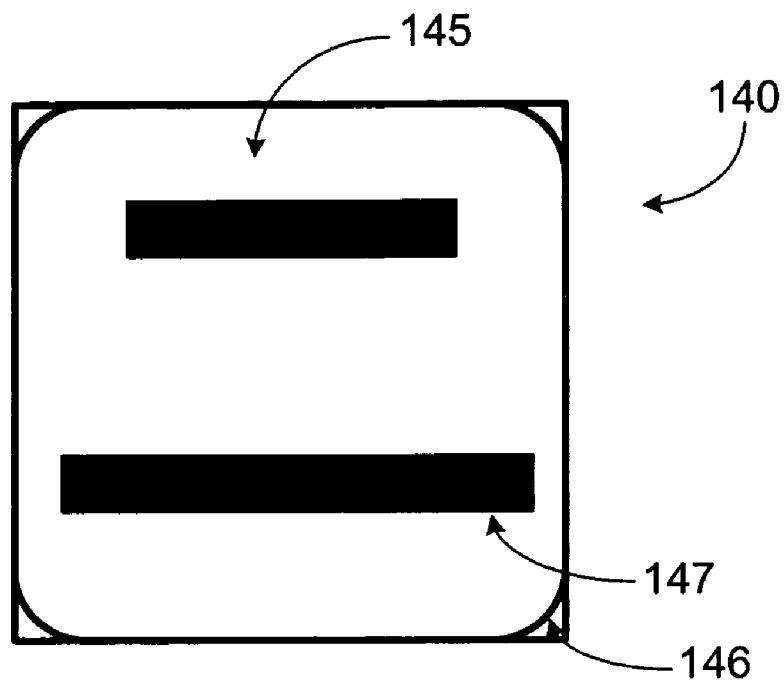
FIG. 12 is a plan view of a surface of a representative double-sided electronic game card according to an implementation of the present invention.
Figure 13:
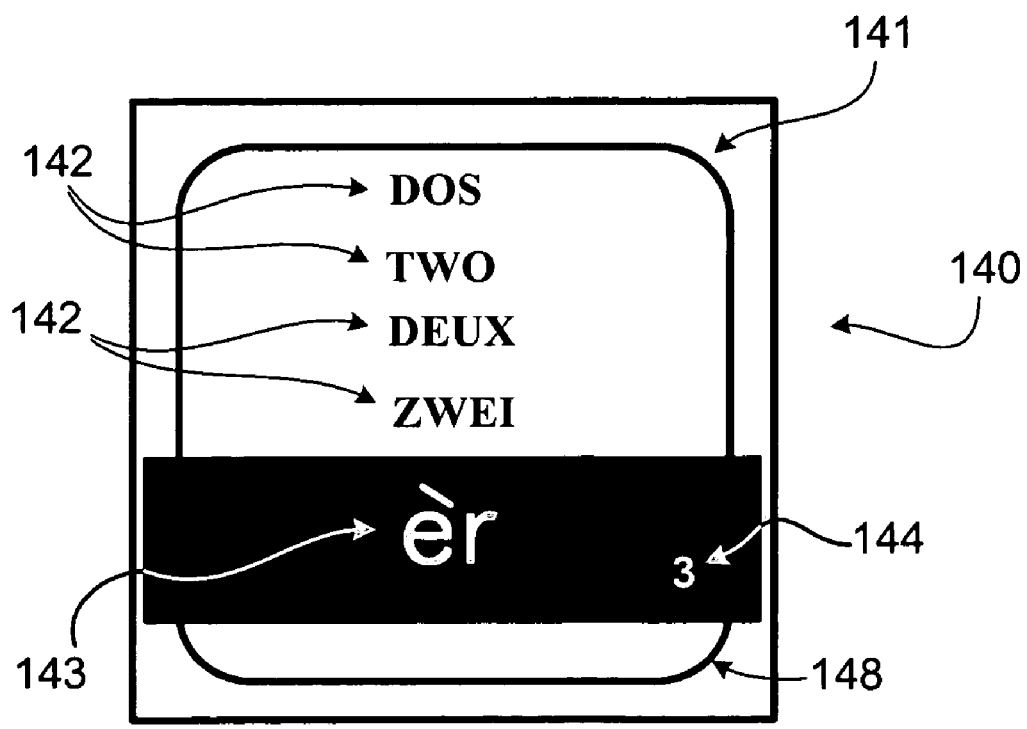
FIG. 13 is a plan view of the opposite surface of the representative double-sided electronic game card of FIG. 12 according to an implementation of the present invention.

As shown in FIGS. 12-13, a representative double-sided electronic game card 140 may have a primary language word 147 on a primary language side 145. The secondary language side 141 may include a pronunciation key 143 and a game card reference number 144. The secondary language side 141 also may have one or more secondary language words 142, each of which is a word representing the same vocabulary element in a different language. The languages in which the words 142, 147 appear also should be language options 107 that are available on the electronic game board 110 and that a player can select using the language selector 109. The two sides 145, 141 may have electrical contacts 146, 148, respectively, for example bordering the words 147, 142.

With the pronunciation device 100, one or more electronic game boards 110, and one or both of the sets of electronic game cards 130, 140, an electronic implementation of the educational board game may be played according to the various beginner, intermediate, and advanced levels described above. In addition, the player is exposed to the proper pronunciation of words of a language that is to be learned.

In an embodiment of the electronic implementation of the game, for example, only the double-sided game cards 140 are used in conjunction with the device 100 and either sides of the boards 110. When a board 110 is placed within the receiving area 102 and a card 140 is positioned correctly above a corresponding vocabulary element (i.e., an image 122 or word 127) such that the respective contacts of the board and the card are electro-magnetically coupled, the device 100 recognizes a correct match and the speaker 105 pronounces the word for the vocabulary element. If the player is playing with the image side 120 facing up, the speaker 105 pronounces the word in the language option 107 indicated by the selector 109. In other embodiments, the game may be played with the single-sided game cards 130.

Figure 14:
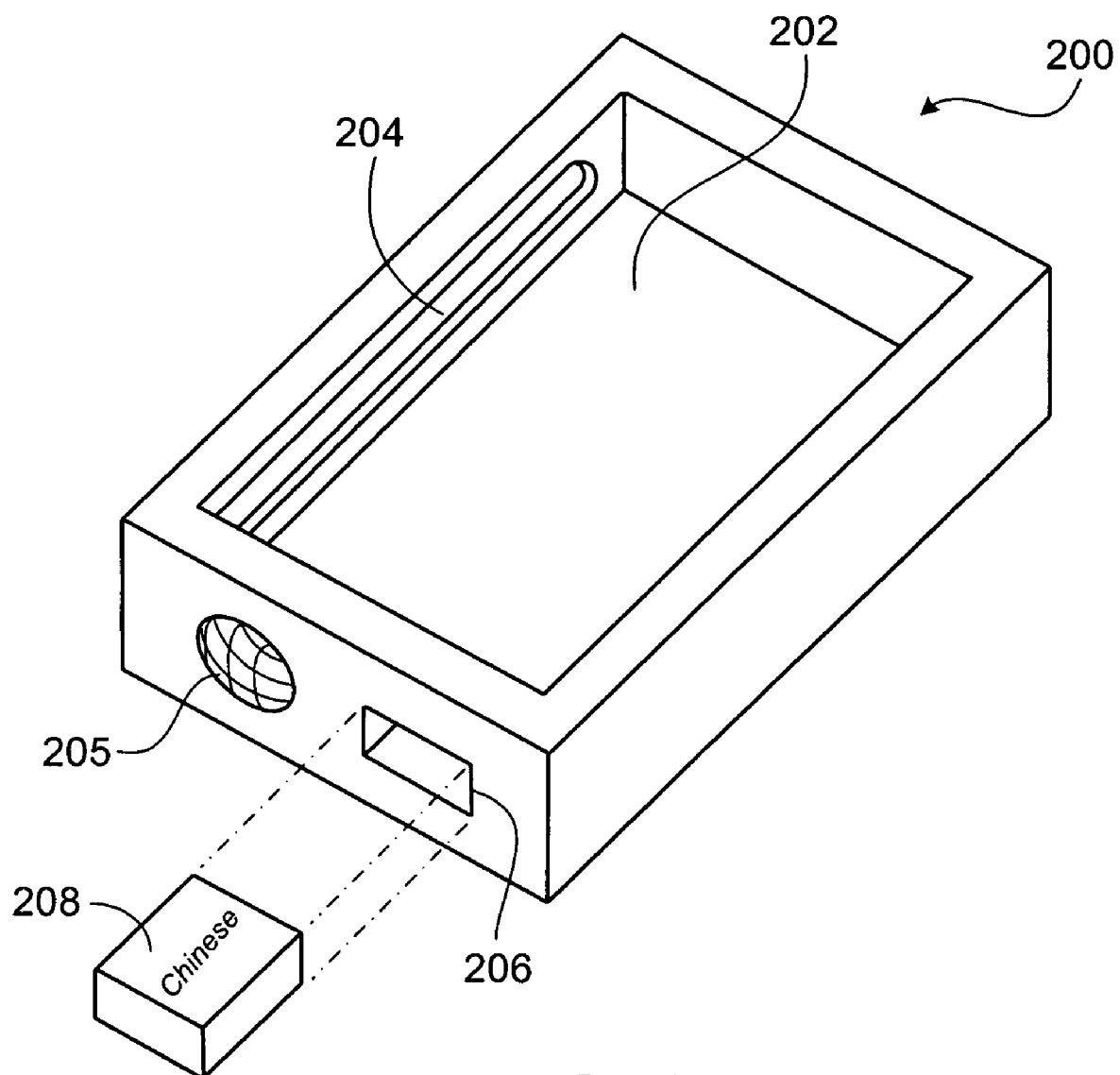
FIG. 14 is a perspective view of a second electronic pronunciation device and cartridge according to a implementation of the present invention.

FIG. 7 shows an example of an implementation of a pronunciation device 100. In an alternative implementation, there does not need to be a fixed number of language options 107. For example, FIG. 14 shows a pronunciation device 200 that includes a game board receiving area 202, a slot 204 through which the board may be inserted, a speaker 205, and a cartridge receiver 206. Also shown is a cartridge 208, which determines the language in which the vocabulary element is pronounced. The cartridge 208 is preloaded with the pronunciations of words of one or more languages and is connected to the device 200 when inserted into the cartridge receiver 206.

When a cartridge 208 is coupled to the device 200 and one of the cards 130, 140 is properly matched to a vocabulary element on a board 110 that is positioned within the receiving area 202, the speaker 205 generates an audible signal representing the pronunciation of the word for the vocabulary element in a selected one of the preloaded languages. If the cartridge 208 is preloaded with only Chinese, for example, the word is pronounced in Chinese. If another language is desired, a different cartridge preloaded with that language may be inserted. Alternatively, a single cartridge preloaded with multiple languages may be inserted, in which case the language in which the word is pronounced may be selected, for example, by selecting the position of a language selector or pressing a button located on the cartridge. Preferably, the language in which the word is pronounced by the device 200 matches a language in which the words 137, 147, 142 on the cards 130, 140 appear.

Figure 15:
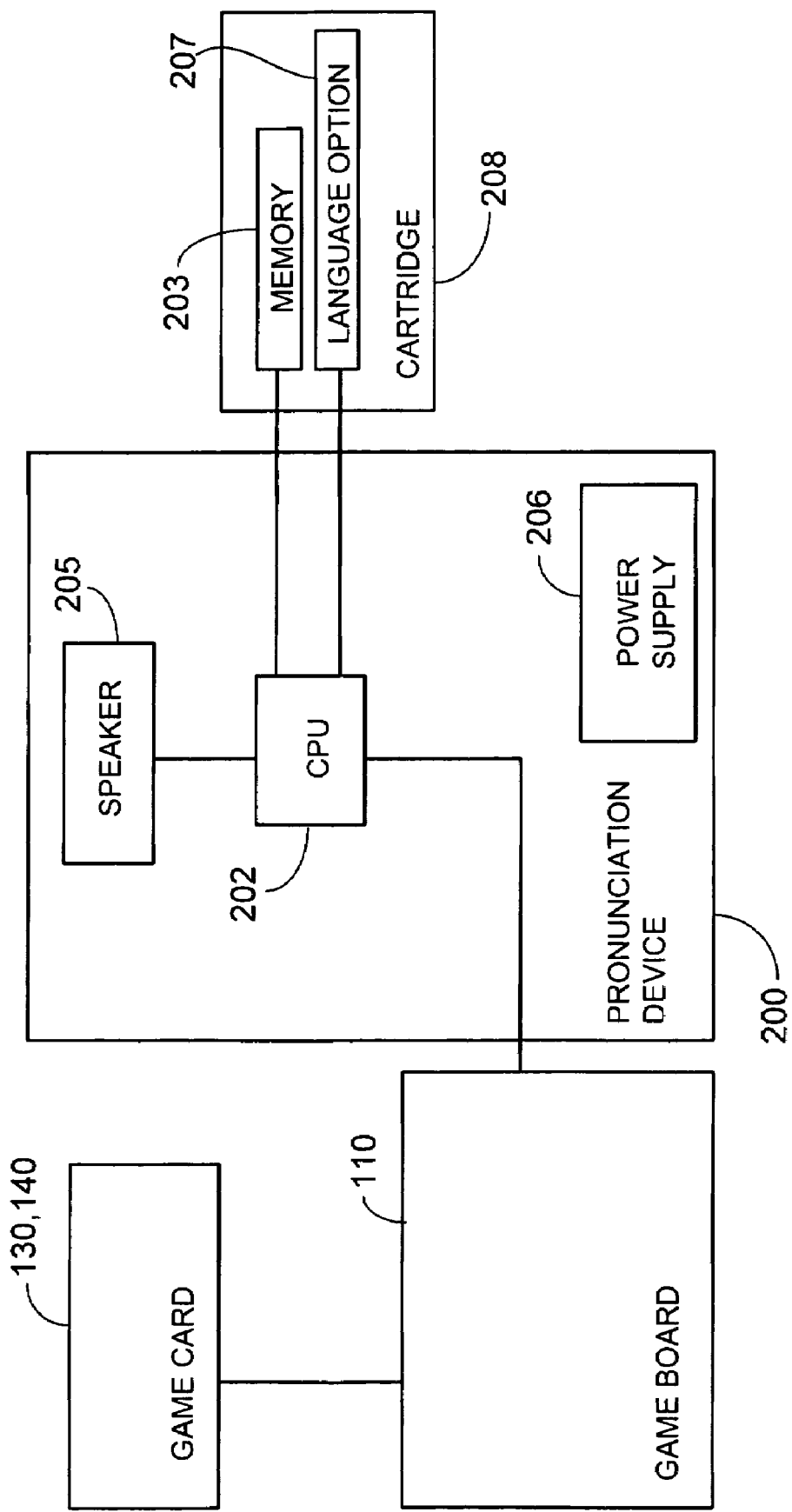
FIG. 15 is a block diagram of the second electronic pronunciation device of FIG. 14.

FIG. 15 shows a block diagram of the pronunciation device 200. Unlike the block diagram shown in FIG. 6 for the pronunciation device 100, the device 200 does not include memory or a language option. Instead, memory 203 and language option 207 is included in the cartridge 208 which electrically couples to the device 200.

A number of implementations have been described. Various modifications may be made without departing from the spirit and scope of the invention. Accordingly, other implementations are within the scope of the claims.

What is claimed is:

1. A board game comprising:
   a game board having front and back surfaces, wherein the front surface has a plurality of locations each of which has an image representative of one of a plurality of words or phrases in a first language and the back surface has a plurality of locations each of which has one of the plurality of words or phrases in the first language; and
   a first group of cards, wherein each card in the group has on a front face a word in the first language corresponding to one of the images or plurality of words or phrases on a surface of the game board wherein each card in the group has on a back face a translation of the word on the front face into a second language.

2. The board game of claim 1 further comprising a second group of cards, wherein each card in the second group has on a front face a word in the first language corresponding to one of the images or words or phrases on a surface of the game board.

3. A board game comprising:
- a game board having front and back surfaces, wherein the front surface has a plurality of locations each of which has an image representative of word or phrase in a first language and the back surface has a plurality of locations each of which has one of a plurality of words or phrases in the first language;
- a first group of cards, wherein each card in the group is adapted to couple to the game board and has on a front face a first word in the first language corresponding to an image or word or phrase on a surface of the game board; and
- a pronunciation device having a speaker, wherein the device is adapted to couple to the game board so that when a card in the group is placed on a corresponding image or word or phrase on the game board, an audible signal representing the pronunciation of the image or word or phrase is generated through the speaker and wherein each card in the group has on a back face a translation of the first word on the front face into a second language.

4. The board game of claim 3 further comprising a second group of cards, wherein each card in the second group is adapted to couple to the game board and has on a face a second word in the first language corresponding to an image or word or phrase on a surface of the game board.

5. A board game comprising:
- a game board having a front surface comprising a plurality of locations each which has a respective vocabulary element and wherein each of the vocabulary elements is (i) an image representative of one of a plurality of words or phrases in the first language or (ii) one of the plurality of words or phrases in the first language; and
- a first group of cards, wherein each card in the group has (i) on a front face one of a plurality of words or phrases in a first language corresponding to one of the vocabulary elements on a surface of the game board and (ii) on a back face a translation of the word or phrase on the front face into a second language.

6. The board game of claim 5 wherein each card in the group has on a back face a key for pronouncing the word on the front face.

7. The board game of claim 5 wherein each card in the group has on a back face a number for matching to a number on the game board.

8. The board game of claim 5 further comprising a second group of cards, wherein each card in the second group has on a face a word in the first language corresponding to one of the images or words or phrases on a surface of the game board.

9. A method for playing a game comprising:
- selecting a card from a group of cards, wherein each card in the group has on a front face one of a plurality of words or phrases in a first language corresponding to an image or word or phrase on a surface of a game board, wherein the game board has front and back surfaces, wherein the front surface of the game board has a plurality of locations each of which has an image representative of one of the plurality of words or phrases in the first language and the back surface has plurality of locations each of which has one of the plurality of words or phrases in the first language;
- placing the selected card on a corresponding image or word or phrase on the game board;
- continuing to select and place cards on the game board until a predetermined number of matches have been obtained; and
- including verifying the correctness of placement of a selected card by referring to a second group of cards, wherein each card in the second group has a translation of the word on the front face into a second language.

* * * * *